US007884797B1

(12) United States Patent
Ning

(10) Patent No.: US 7,884,797 B1
(45) Date of Patent: Feb. 8, 2011

(54) CONDUCTIVE CAP

(76) Inventor: Alice Ning, 1499 Massachusetts Ave. NW. #1020, Washington, DC (US) 20005

( * ) Notice: Subject to any disclaimer, the term of this patent is extended or adjusted under 35 U.S.C. 154(b) by 0 days.

(21) Appl. No.: 12/825,247

(22) Filed: Jun. 28, 2010

(51) Int. Cl.
A41B 11/00 (2006.01)
A43B 17/00 (2006.01)
A44B 1/32 (2006.01)
A44B 1/34 (2006.01)
G09G 5/00 (2006.01)
G06F 3/033 (2006.01)
G06F 3/041 (2006.01)
G09G 5/08 (2006.01)

(52) U.S. Cl. .................. 345/156; 2/239; 24/114.4; 24/706.9; 24/104; 24/306; 24/586.11; 345/157; 345/173; 345/179

(58) Field of Classification Search ............ 2/239; 24/91.1, 114.4, 706.9, 104, 306, 703, 704.1, 24/584.1, 586.11; 345/156, 157, 173, 179
See application file for complete search history.

(56) References Cited

U.S. PATENT DOCUMENTS

| 3,220,075 | A | * | 11/1965 | Ott | ............................. | 24/709.3 |
| 5,107,573 | A | | 4/1992 | Zhang | | |
| 2005/0231471 | A1 | * | 10/2005 | Mallard et al. | .............. | 345/156 |
| 2009/0000010 | A1 | * | 1/2009 | Sunder et al. | .................. | 2/163 |
| 2009/0066658 | A1 | * | 3/2009 | Earl | ........................... | 345/173 |
| 2010/0000009 | A1 | * | 1/2010 | Morgan | ........................ | 2/414 |
| 2010/0090966 | A1 | * | 4/2010 | Gregorio | .................... | 345/173 |

OTHER PUBLICATIONS

"QUIRKY", Screenshot dated Oct. 7, 2010, 1 page, URL http://www.quirky.com/products/37-Digits-Conductive-Glove-Pins.*
"QUIRKY", Screenshot dated Oct. 7, 2010, 1 page, URL http://www.quirky.com/products/37/overview.*
"QUIRKY", Screenshot dated Oct. 7, 2010, 2 pages, URL http://www.quirky.com/projects/270-Digits-industrial-design.*
"QUIRKY", Screenshot dated Oct. 7, 2010, 1 page, URL http://s3.amazonaws.com/kore/production/attachments/assets/4864/original/Conducting_Finger_Tip.jpg.*
Brian Shy; Conducting Buttons; http://www.quirky.com/products/37-Digits-Conductive-Glove-Pins; Publication date Unknown.

* cited by examiner

Primary Examiner—Alexander S Beck
(74) Attorney, Agent, or Firm—The Law Firm of Andrea Hence Evans, LLC

(57) ABSTRACT

A connector featuring a conductive cap and conductive peg to be attached to any digit covering apparatus, such as a glove. The connector comprises a cap and peg made of a conductive material. The peg is placed on a user's digit and the at least one post mechanism is extended through the digit covering. The cap and peg are engaged by at least one post mechanism extending from the peg. The at least one post mechanism is received by at least one aperture on the cap. The connector also features a post mechanism on a back side of the connector. The post mechanism has a pin, pin head and pin holder that attaches the connector to the glove. Users do not have to remove their digit covering apparatus to interact with a touch screen device. The conductive connector affords the user the ability to input onto a touch-screen without removal of their digit covering apparatus, such as a glove.

7 Claims, 6 Drawing Sheets

CONDUCTIVE CAP

FIELD OF THE INVENTION

The present invention relates in general to a conductive cap that allows the user to input into an electronic device without removal of a hand covering.

BACKGROUND OF THE INVENTION

Many electronic devices such as cameras, MP3® players, cell phones, iPod®, for example have a touch screen. A touch screen is a computer display screen that is also an input device. There are a variety of screens which are sensitive to either pressure, light waves, ultrasonic waves, or electric charge. A user interacts with the touch screen device by touching graphics or text on the screen. For example, on a cell phone such as the iPhone®, a user can use the touch screen interface to place a call, answer the phone, play games and surf the internet, to name a few.

With cell phones becoming more popular and having more capabilities, users have become more dependent on them. When a cell phone breaks, the user may have to wait several days to retrieve their information and they will likely have to wait for a replace phone. Users tend to drop and break their phones more during winter season. During winter season, most users wear gloves to protect their skin from frigid weather and for warmth. However, gloves do not work with devices with capacitive touch screens. A user must constantly remove and replace gloves to use the touch screen device. Fiddling with the phone is a burden and often the device is dropped because the user must support the device and take the gloves off to retrieve an email or answer a call, for example.

Users have cut holes in their gloves to make them fingerless but this is unattractive and does not protect their fingers from frigid temperatures.

SUMMARY OF THE INVENTION

This invention introduces a conductive cap to be attached to any glove such that users do not have to remove their glove to interact with a touch screen device.

An aspect of an embodiment of the invention provides a connector having a front cap worn on the outside of a glove and a back cap attached to a peg having posts inserted through the glove to attach the front cap to the peg.

A further aspect of an embodiment of the invention provides a connector device having a front cap having one or more post(s) inserted through the glove and secured to one end of the front cap. The post(s) both secure(s) the cap to the glove and make(s) contact with the inside of the glove.

A further aspect of an embodiment of the invention provides the cap, peg, and post(s) being conductive such that the user can use the front of the cap as an input device for a touch screen electronic device.

Additional aspects, objectives, features and advantages of the present invention will become apparent from the following description of the preferred embodiments with reference to the attached drawings.

DETAILED DESCRIPTION OF THE INVENTION

Figure 1:
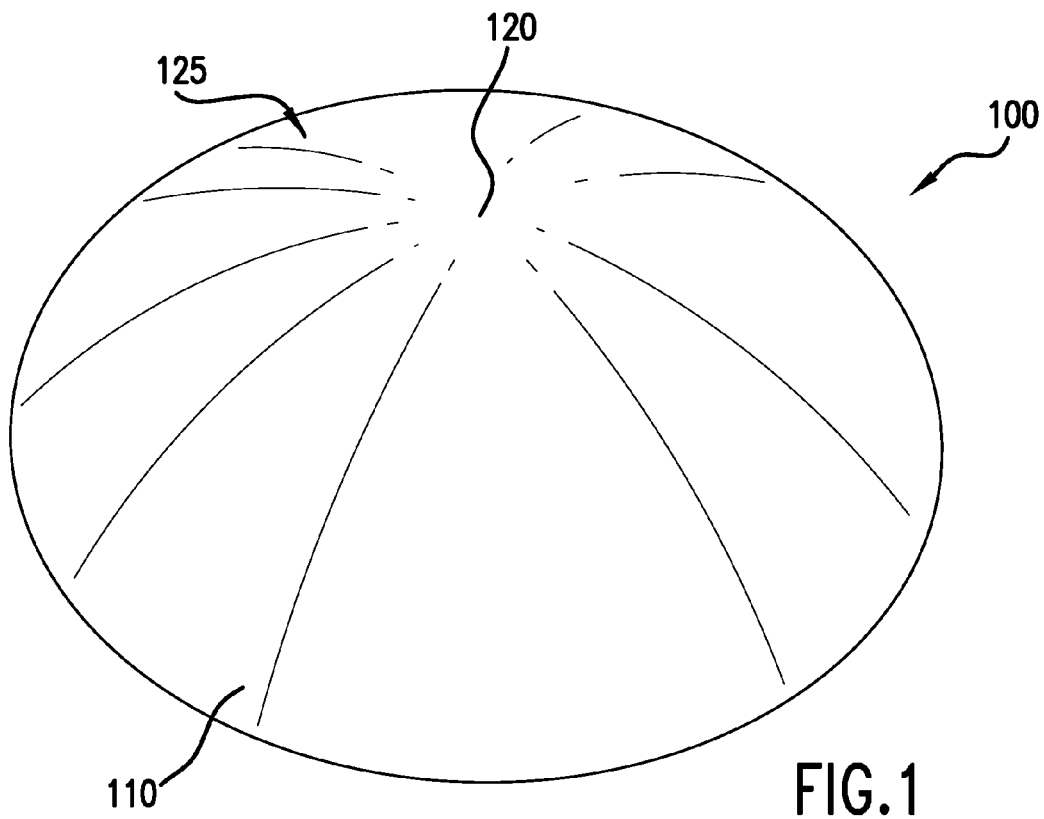
FIG. 1 is a perspective top view of the cap.

FIG. 1 is a perspective view of the cap 100. The cap 100 is made of a conductive material having a front cap side 110 that is convex towards a point on the surface of the front side of the cap 120. The cap may be of varying shapes, sizes, dimensions, and thickness while it will remain convex towards one point on the surface of the front side of the cap (i.e. oval, teardrop, heart, star, flower, etc.)

The convex shape of the cap aids in the user accurately touching a single key or button on an electrical device. The cap is shaped such that the user can avoid mistakenly touching multiple keys when their intentions are to touch a single key or button. The cap diameter is approximately ⅛ cm to 1 cm. The cap may be larger or smaller depending on the size of the user's digit or the size of the keys on the electrical device. The front cap side 110 features an enamel layer 125 on the front cap side 110 to prevent damage to an electrical device touch screen. The enamel layer 125 is a thin layer of synthetic material that is durable. The layer 125 does not prevent the cap 100 from being conductive so it can interface with an electrical device. The front cap side 110 interfaces with the electrical device touch screen such that a covering does not have to be removed from the digit for interfacing with the electrical device. The conductive material is preferably aluminum however other known conductive materials may be substituted. The front cap side 110 can also be personalized with any ornamental design or style. For example, a fingerprint design may be shown on the front cap side 110 since the cap 100 will be used as an extension to the user's digit.

Figure 2:
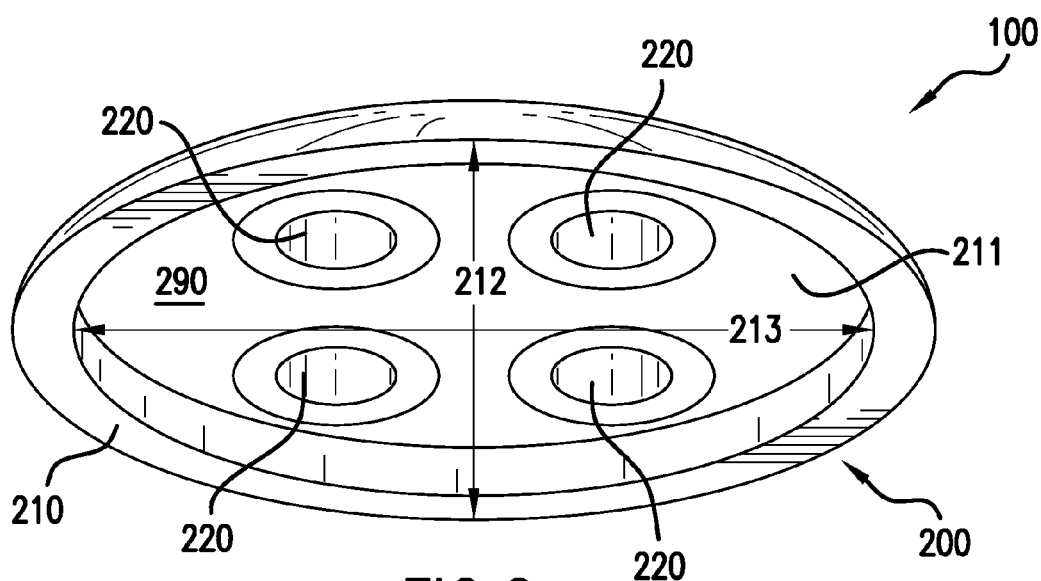
FIG. 2 is a perspective back view of the cap.
Figure 3:
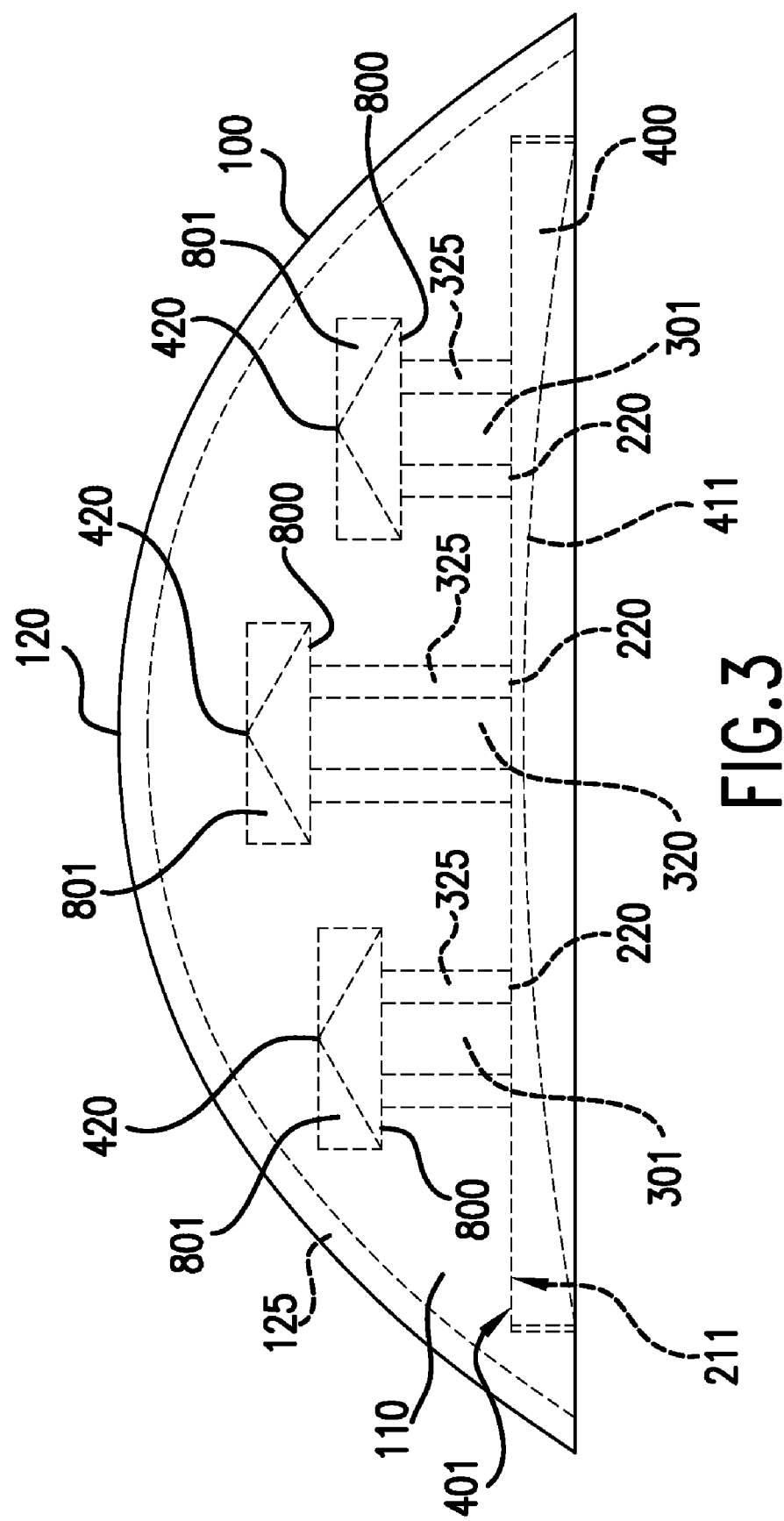
FIG. 3 is a side view of the cap and the peg illustrating the post channels.

FIG. 2 is a perspective back view of the cap 100. A back cap side 200 is shown. The cap edges 210 extend over a hollow cavity 211. The cavity diameter 213 is less than the back cap side diameter 212. The back cap side diameter is approximately 1/16 cm to 1 cm. The cavity 211 is solid with the exception of aperture(s) 220. The aperture(s) 220 lie flush on the cavity 211. The aperture(s) 220 have a diameter of ⅛ cm at the largest. The aperture(s) 220 are openings that are sized to receive post(s) 301. The aperture(s) 220 extend upward into post channels 325. Each aperture 220 has a unique and varying depth. It is understood that the aperture(s) may feature depths that are equal if the post length(s) is/are equal. The apertures 220 further comprise channels 325. The post channels 325 are equal depths or heights as the respective post 301 it is to receive. The post channel(s) 325 extend upwards inside of the cap 100 and form a T shape, as show in FIG. 3. The bottom walls 800 of the channel stop the post(s) from being removed. The post top(s) is/are squeezed and disfigured throughout the channel until they reach the top portion 801 the channel. When it reaches the top portion 801 the post tops expand to their original shape. FIG. 3 is a perspective view of the cap illustrating the post channels. The conductive material conceals the channels 325.

Figure 4:
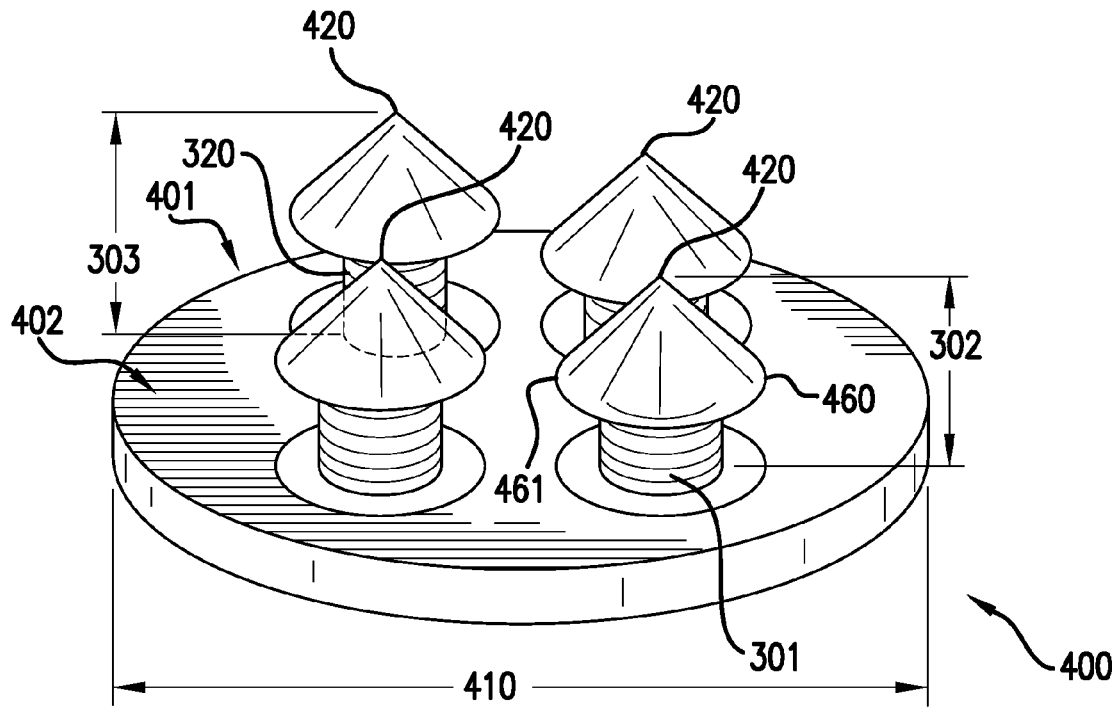
FIG. 4 is a perspective back view of the peg.
Figure 5:
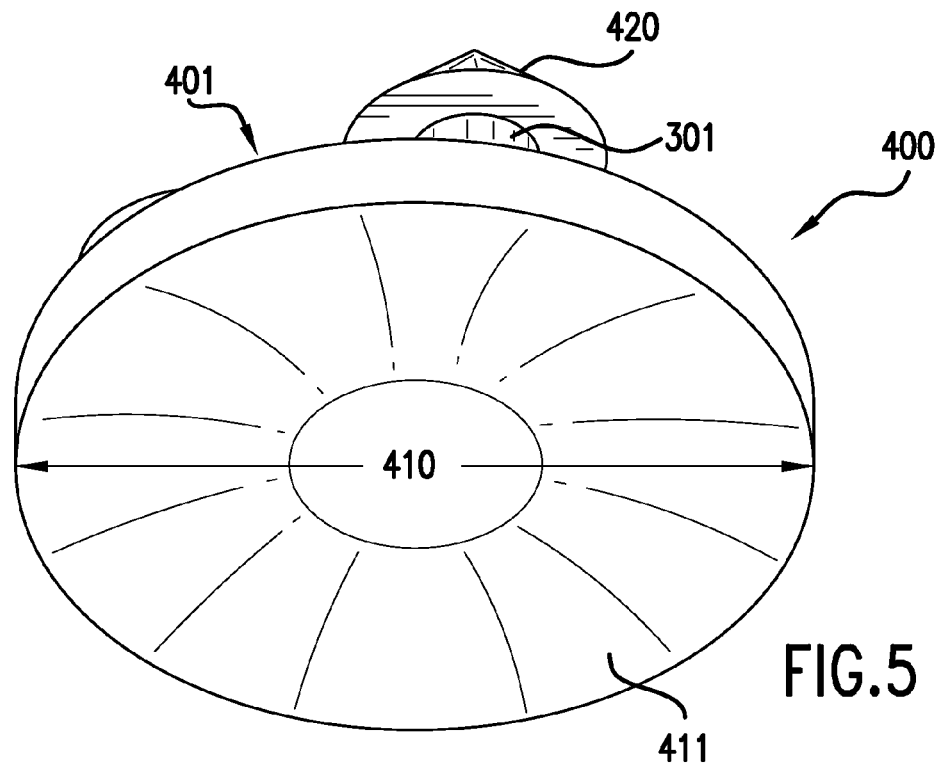
FIG. 5 is a perspective front view of the peg.

FIG. 4 is a perspective back view of the peg 400. The peg's diameter 410 is equal to the back cap side diameter 212. The peg 400 is also made of a conductive material. The peg 400 has a front peg side 411, shown in FIG. 5, and a back peg side 401. The back peg side 401 has a flat surface 402. The back peg side 401 has at least one post 301 having a first post length 302 extending in an upward direction. The back peg side 401 features a second post 320 having a second post length 303 extending in an upward direction. The first post length 302 may be a different length than the second post length 303. The post length is the measurement of the post from the flat surface 402 to the top of the post tops 420. The thickness of the posts 320, 301 may also differ from each other. It is understood that more or less posts may be featured that are of the same thickness and height as each other or the posts may be varying heights, shapes and thickness. The posts are of varying thickness and heights to ensure the post tops 420 properly penetrate through a digit or hand covering such as a glove. A post with a larger height is desirable to pierce a glove that is made of a thick material. Similarly, a post with varying thickness is desirable to hold the cap steady against the hand covering. Posts and apertures may vary in lengths, thickness and shape to accommodate different types of materials.

The posts 301, 320 are also made of a conductive material. The post tops 420 are a mushroom-like shape and sit on top of the posts 320, 301. The post tops 420 are moldable or flexible such that they fit inside their respective aperture 220. The post top sides 460, 461 are squeezed towards each other so that the post top 420 can easily fit inside of the aperture 220. The sides 460, 461 remain deformed or squeezed as it moves upward in the post channel. The apertures 220 on the back cap side 200 are positioned so that they are aligned with the posts 301, 320 and post tops 420 when the cap 100 is engaged with the peg 400. The post 301, 320 and post tops 420 are a one piece structure however, posts 301, 320 and tops 420 may be designed so that the tops are detachable for cleaning or replacement. The posts 301, 320 have a ribbed surface that aid in gripping the inside surface of the channels 325. To engage the cap 100 with the peg 400, the back cap side 200 is in a face down direction and the peg 400 is on its back side 401 with the connected post 301, 320 and post tops 420 extending in an outward and upward direction from the back side 401. The front peg side 410 is concave upwards towards a center of the peg and accommodates a bottom portion of the digit when the first or second post 301, 320 extend through the covering and engage the at least one aperture 220. Typically, a person only needs to attach the connector to one digit or finger to interface with an electrical device. However, multiple connectors can be connected to multiple digits in the instance that a user may desire to attach the connectors to their thumbs for texting, for example.

Figure 6:
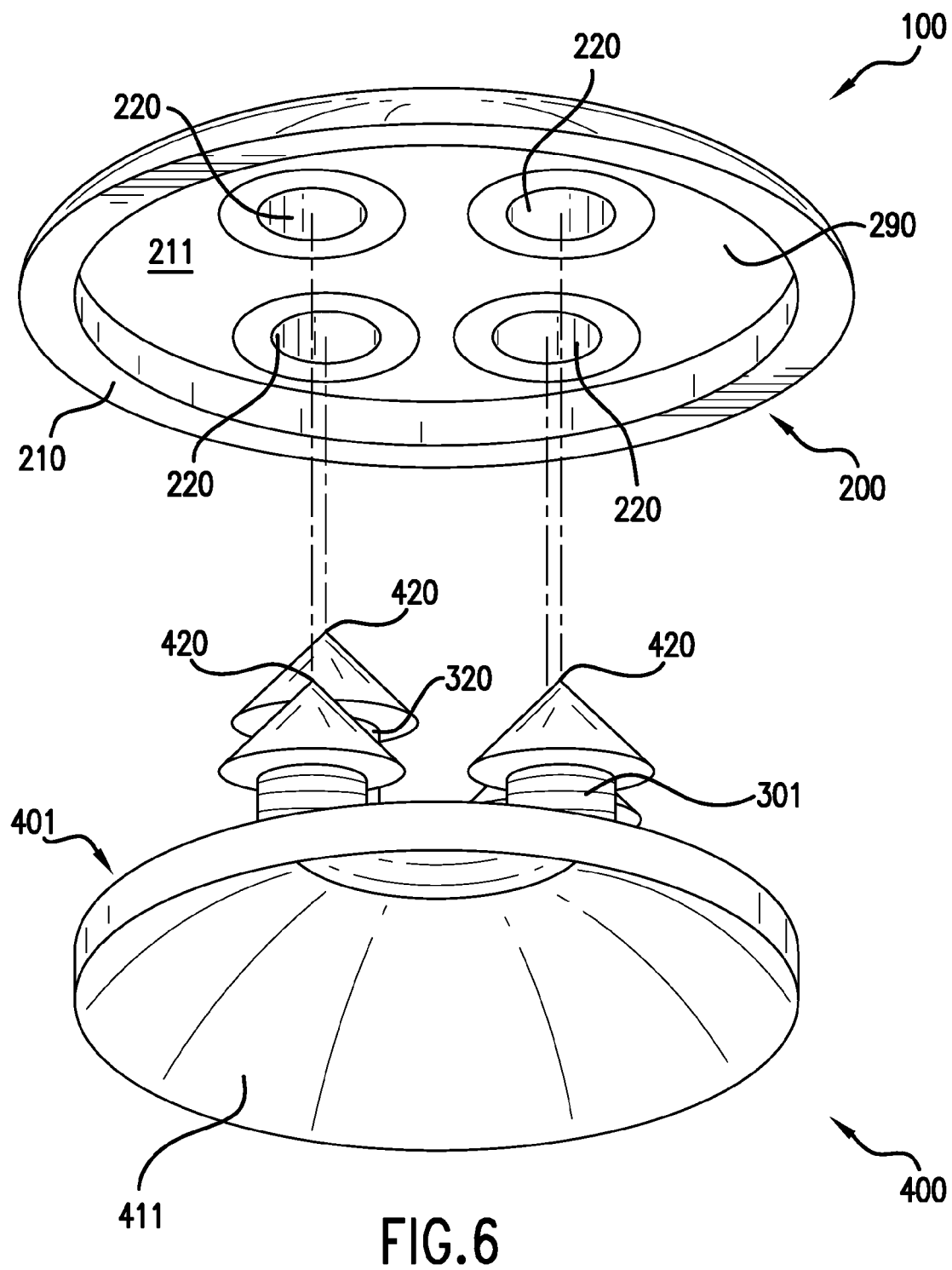
FIG. 6 is a perspective view of the cap aligned with the peg for attachment.
Figure 7:
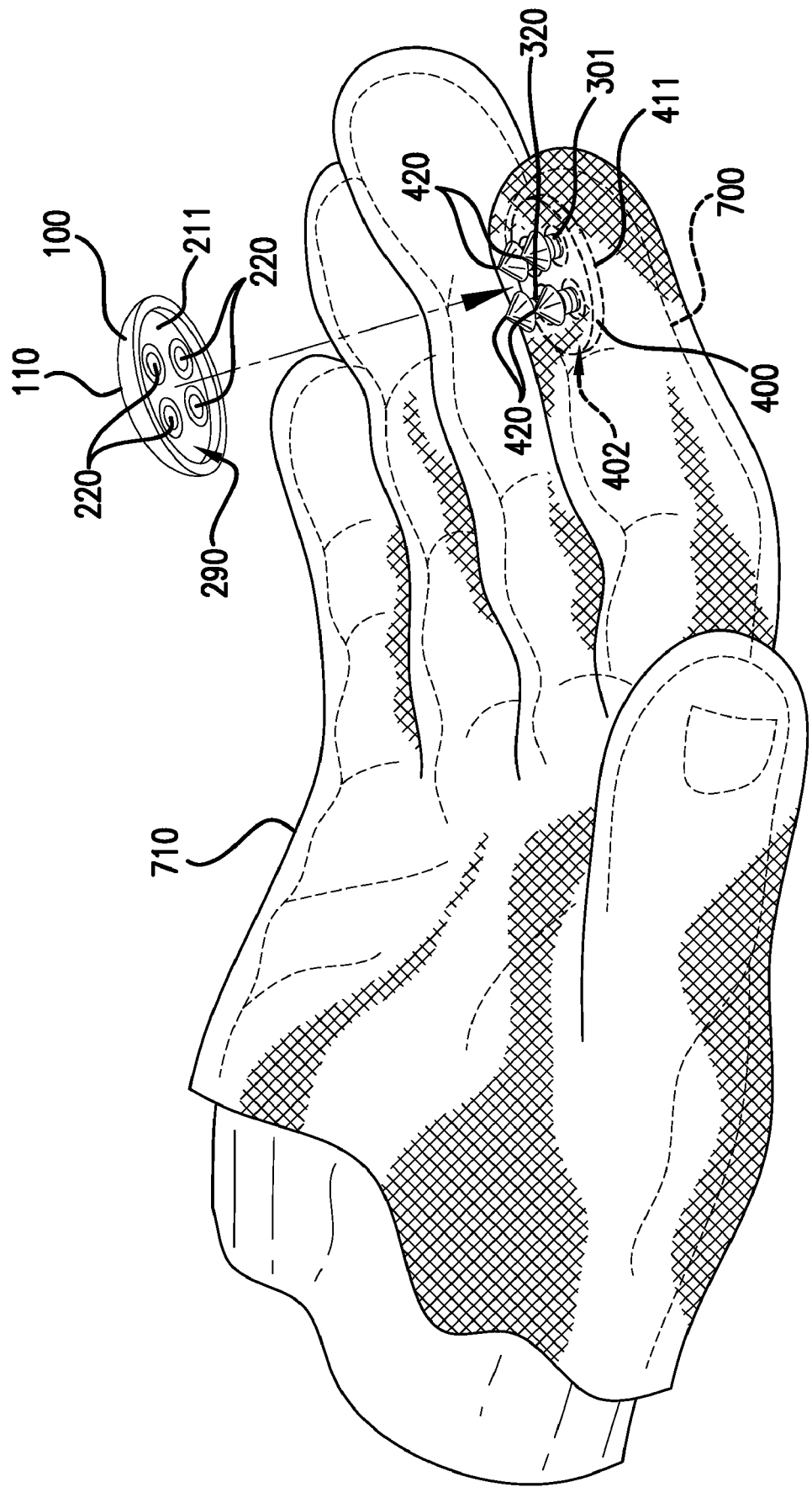
FIG. 7 is a perspective view of the cap and peg attached to a digit-covering apparatus shown with a digit inside of the digit covering apparatus.

FIG. 6 is a perspective view of the cap 100 aligned with the peg 400 for attachment with each other. As discussed the post 301 and tops 420 are aligned with the apertures 220 on the cap 100. The peg 400 fits flush inside of the cap cavity 211 having a back cap surface 290, as shown in FIG. 7. FIG. 7 is a perspective view of the cap 100 and peg 400 attached to a digit-covering apparatus shown with a digit 700 inside of the digit covering apparatus or glove 710. The digit 700 is positioned palm up so that the bottom of the finger makes contact with the peg front side 411. The user places the peg 400 inside of the glove 710 in the area where a digit will be placed. The peg 400 will be positioned so that the post 301 and post tops 420 pierce the glove 710. The post and tops shown in the drawings are enhanced for illustration purposes. However, the post and tops are thin like a pin or paper clip size so the piercings are not visible when the glove is removed because they are so tiny. The cap 100 is then positioned above the peg 400 on the outside of the glove 710 so that the post 310 and tops 420 are connected to the apertures 220. The cap 100 is moved towards the peg 400 and the peg 400 is moved towards the cap 100 until the back peg surface 402 is flush with the covering 710. The back cap surface 290 is flush with the covering 710 when the cap 100 is fully engaged with the peg 400. The user can insert his hands inside the glove 710 whereby the bottom portion of his digit will come into direct contact with the front peg side 411. The concave area of the front peg side 411 is sized to comfortably support the finger. The engaged cap and peg 800, connector, attached to the covering 710 act as an input device for an electrical device. The front cap side 110 makes direct contact with a touch screen on the electrical device. Because the connector 800 is made from conductive material and is fully conductive, the user can use the touch screen device without having to remove his glove and use his bare finger.

Figure 8:
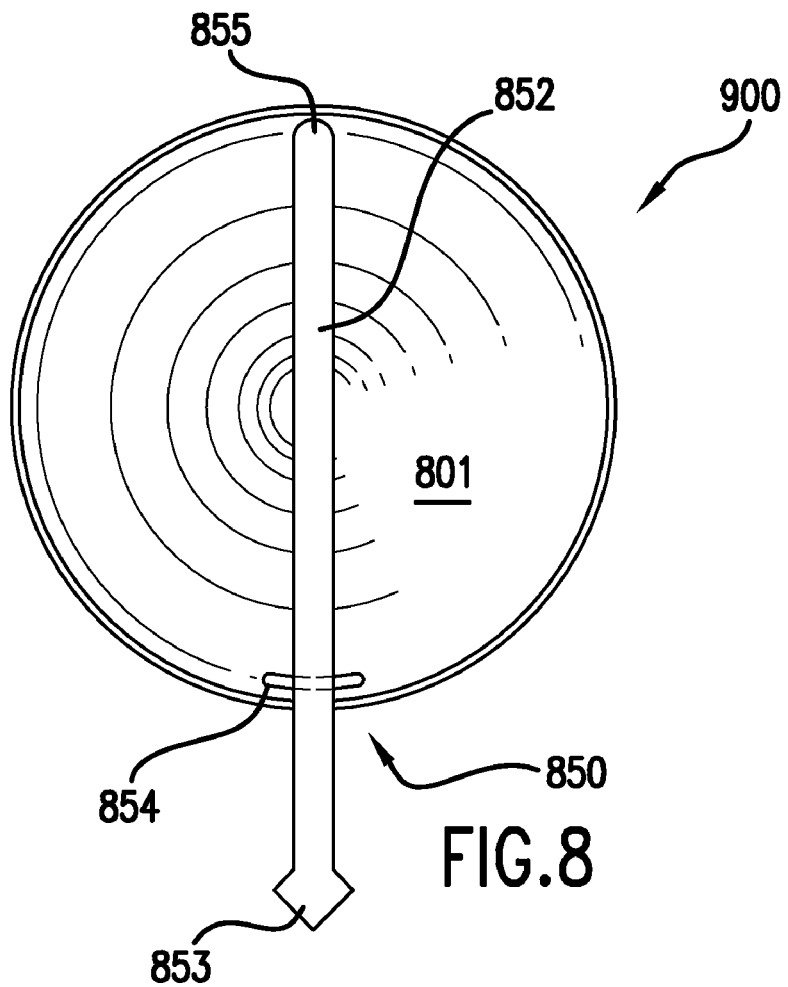
FIG. 8 is a back view of the cap with a post mechanism.

FIG. 8 is a back view of the cap 900 with a post mechanism 850. The back side 801 of the cap 900 is concave to contour the surface of the user's finger. The front side of the cap is convex as discussed above. The back cap side 801 has a concave cavity such that the digit is aligned with the cavity when attaching the connector to the covering. The cap is made from a conductive material. The post mechanism 800 comprises a pin 852, a pin head 853 and a pin holder 854. The pin head 853 is sharp so that it can pierce the covering. The head 853 enters through a first point on the covering and out a second point on the covering and the pin head 853 is inserted into the pin holder 854 to attach the connector to the covering. The pin holder 854 is an elongated aperture that is flush on the back cap side 801. The pin 852 extends is a horizontal direction along the back cap side 801. The pin 852 is fixed to the back cap side 801 at one end 855 of the pin 852. In an open position, the secured end 855 of the pin 852 is on a hinge such that the pin can move in an upward and downward direction, away and towards the back surface of the cap. The pin head 853 is not housed inside of the holder 854 in an open position.

Figure 9:
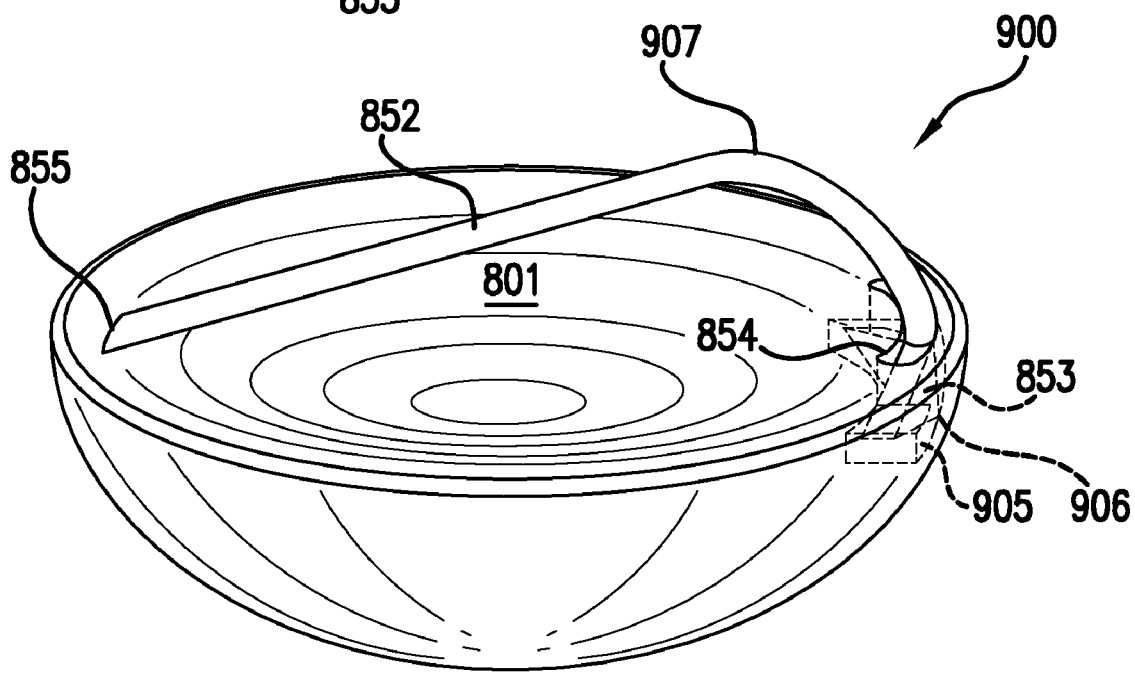
FIG. 9 is a perspective view of the cap with the post mechanism in the closed position.

FIG. 9 is a perspective view of the cap 900 with the post mechanism 850 in the closed position. The end 855 of the pin 852 is secured to one end of the cap. The pin is lifted and the pin head 853 is placed inside of the holder 854. The holder 854 is an aperture in the form of a slit with a width able to receive the pin head 853. The holder 854 opens into a pin channel 905. The channel 905 is in the shape of an inverted T. The pin head 853 deforms through the channel 905 until it reaches the channel base 906 where it fits into the base 906 snug and reforms into its original shape. The pin 852 is bent at a middle portion 907 so that the head 853 can be positioned to fit inside of the aperture 854. Once the head 853 is positioned and fitted inside the aperture 854, the pin can be molded to lie flush against the back side 801 of the cap 900. The pin can be of varying thicknesses to easily pierce through gloves made of materials with varying thicknesses. The user connects the cap 900 to a glove, as described using the post mechanism 850 to insert the pin in the glove. Once the cap is pinned near an area where a finger is on the glove, the user can where the glove while interfacing with a touch screen electrical device, whereby the front of the cap makes direct contact with the screen. The users digit will touch a portion of the pin 852 while the back surface of the cap 801 will make contact with the glove.

With the use of tweezers or a similar tool, the pin can be lifted from its flush position against the cap and pried out carefully for removal.

The invention has been described in detail with particular reference to certain preferred embodiments thereof, but it will be understood that variations and modifications can be effected within the spirit and scope of the invention.

The invention claimed is:

1. A connector for attachment to a covering for a digit comprising:
   a cap made of a conductive material having a front cap side that is convex towards a point on the surface of the front side of the cap, and back cap side that features at least one aperture;
   a peg made of the conductive material having a front peg side and a back peg side, wherein a first post having a first post length and a second post having a second post length extend from the back peg side, wherein the first post length is different from the second post length;
   wherein the front peg side is concave towards a center of the peg and accommodates a bottom portion of the digit when the first or second post extend through the covering and engage the at least one aperture.

2. The connector for attachment to the covering for the digit of claim 1, wherein the first or second post are aligned with at least one aperture when the cap is engaged with peg.

3. The connector for attachment to the covering for the digit of claim 1, wherein the apertures further comprise a channel to receive the posts.

4. The connector for attachment to the covering for the digit of claim 1, wherein the back peg side further comprises a back peg surface that is flush with the covering.

5. The connector for attachment to the covering for the digit of claim 4, wherein the back cap side further comprises a back cap surface that is flush with the covering.

6. The connector for attachment to the covering for the digit of claim 1 wherein the engaged cap and peg attached to the covering act as an input device for an electrical device.

7. A method of interacting with a touch screen on an electrical device wearing a digit covering comprising:
   providing a cap made of a conductive material having a front cap side that is convex towards a point on the surface of the front side of the cap, and back cap side that features at least one aperture;
   providing a peg made of the conductive material having at front peg side and a back peg side, the back peg side comprising at least one post mechanism sized to engage the at least one aperture, wherein the front peg side is concave towards a center of the peg;
   placing the front peg side on a bottom portion of the digit so that the post mechanism is extending upward;
   extending the post through the digit covering;
   aligning the at least one aperture with the at least one post mechanism, wherein the least one post mechanism is received by the at least one aperture so that the cap is connected to the peg;
   wherein the back peg side further comprises a back peg surface that is flush with the covering when the cap is connected to the peg;
   wherein the back peg side further comprises a back cap surface that is flush with the covering when the cap is connected to the peg;
   using the digit to position the connected cap and peg on the touch screen to provide input into the electrical device.

* * * * *